(12) United States Patent
Kanenari

(10) Patent No.: US 7,730,919 B2
(45) Date of Patent: Jun. 8, 2010

(54) LAMINATE AND PNEUMATIC TIRES MADE BY USING THE SAME

(75) Inventor: Daisuke Kanenari, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 57 days.

(21) Appl. No.: 10/572,549

(22) PCT Filed: Sep. 8, 2004

(86) PCT No.: PCT/JP2004/013400

§ 371 (c)(1), (2), (4) Date: Mar. 17, 2006

(87) PCT Pub. No.: WO2005/030479

PCT Pub. Date: Apr. 7, 2005

(65) Prior Publication Data

US 2007/0031661 A1 Feb. 8, 2007

(30) Foreign Application Priority Data

Sep. 26, 2003 (JP) ............................. 2003-336057

(51) Int. Cl.
B60C 5/12 (2006.01)
B60C 5/14 (2006.01)
B32B 7/12 (2006.01)

(52) U.S. Cl. .................. 152/510; 152/450; 428/343

(58) Field of Classification Search .......... 152/510, 152/450
See application file for complete search history.

(56) References Cited

U.S. PATENT DOCUMENTS 5,532,319 A * 7/1996 Asahara et al. .............. 525/89

2002/0033557 A1* 3/2002 Hashimura et al. ........... 264/315

FOREIGN PATENT DOCUMENTS

| EP | 0 969 039 | 1/2000 |
|----|-----------|--------|
| EP | 1 145 870 A1 | 10/2001 |
| EP | 1 275 692 | 1/2003 |
| EP | 1 424 219 | 6/2004 |

(Continued)

*Primary Examiner*—Justin Fischer
(74) *Attorney, Agent, or Firm*—Connolly Bove Lodge & Hutz LLP; Burton A. Amernick

(57) ABSTRACT

A laminate of an air permeation preventive layer an adhesive layer provided with an air permeation preventive layer comprising a thermoplastic elastomer composition containing a thermoplastic resin as a continuous phase and a rubber composition dispersed therein as a dispersed phase and arranged on one surface of the air permeation preventive layer, an adhesive composition layer having a thickness of 100 μm or less, a self tack of less than 5N and a tack to an unvulcanized diene-based rubber or 5N or more, containing 100 parts by weight of a thermoplastic elastomer containing 50 parts by weight or more of an epoxy-modified styrene-butadiene-based block copolymer so that a total of 30 to 200 parts by weight of a terpene resin and an aromatically modified terpene resin having a weight average molecular weight Mw of 1000 or less and a softening point of 60 to 120° C., 0.1 to 3 parts by weight of an internal mold release agent and 0.1 to 2 parts by weight of an organic peroxide.

20 Claims, 1 Drawing Sheet

FOREIGN PATENT DOCUMENTS

| | | |
|---|---|---|
| JP | 08208899 A | 8/1996 |
| JP | 09003422 A | 1/1997 |
| JP | 11080690 A | 3/1999 |
| JP | 11123907 A | 5/1999 |
| JP | 11240108 A | 9/1999 |
| JP | 2999188 B2 | 11/1999 |
| JP | 2000290629 | * 10/2000 |
| JP | 2001207052 A | 7/2001 |
| WO | WO 92/20538 | * 11/1992 |

* cited by examiner

US 7,730,919 B2

LAMINATE AND PNEUMATIC TIRES MADE BY USING THE SAME

This application is a National Stage of PCT/JP2004/013400 filed Sep. 8, 2004 which in turn claims priority from Japanese Application 2003-336057, filed Sep. 26, 2003.

TECHNICAL FIELD

The present invention relates to a laminate of an air permeation preventive layer/an adhesive (or tackifier, same below) layer and a pneumatic tire using the same. More specifically, it relates to a laminate of an air permeation preventive layer/an adhesive layer having a superior bondability to vulcanized rubber, etc., a superior workability and suitable for decreasing the weight of a pneumatic tire and to a pneumatic tire using the same.

BACKGROUND ART

The technology of using a thermoplastic elastomer for the air permeation preventive layer of a pneumatic tire is known in the art (e.g., see Japanese Patent No. 2999188). For example, when extruding the thermoplastic elastomer, together with an adhesive layer in two layers in cylindrical shapes, if the adhesive layer arranged at the outside is too tacky, it will stick to the take-up (or wind-up) rolls at the time of shaping and seriously degrade the workability. Further, this requires the insertion of release paper, Mylar®, etc. between the tubular materials at the time of take-up—which is a problem in terms of cost and transport weight. Further, if the adhesive layer is insufficiently tacky, at the time of tire production, there is the problem that the air permeation preventive layer will end up peeling off from the tire carcass thereby making formation impossible. Further, if the amount of the cross-linking agent in the adhesive composition is too large, there is the problem of occurrence of scorching in the process of co-extrusion with the thermoplastic elastomer composition at a high temperature. Note that Japanese Patent Publication (A) No. 11-240108 proposes a laminate of a thermoplastic resin/a rubber, but the present invention is directed to the different technology in the object and constitution thereof.

DISCLOSURE OF THE INVENTION

Accordingly, the objects of the present invention are to solve the problems of the above-mentioned prior laminate of air permeation preventive layer/adhesive layer laminates and to provide a laminate of an air permeation preventive layer/an adhesive layer capable of improving the workability in the production of a pneumatic tire and, for example, having a superior bondability with a tire carcass and contributing to the reduction of tire weight.

In accordance with the present invention, there are provided a laminate of an air permeation preventive layer/an adhesive layer provided with (I) an air permeation preventive layer comprising a thermoplastic elastomer composition containing a thermoplastic resin, as a continuous phase, and a rubber composition dispersed therein, as a dispersed phase, and, arranged on one surface of the air permeation preventive layer, (II) an adhesive composition layer having a thickness of 100 μm or less formed from an adhesive composition having a self tack of less than 5N, and a tack to an unvulcanized diene-based rubber of 5N or more containing (i) a total of 100 parts by weight of a thermoplastic elastomer containing 50 parts by weight or more of an epoxy-modified styrene-butadiene-based block copolymer so that an oxirane oxygen content becomes 1 to 3% by weight, (ii) a total of 30 to 200 parts by weight of a terpene resin (A) and an aromatically modified terpene resin (B) in a ratio of (A):(B)=100:0 to 50:50 (weight ratio) having a weight average molecular weight Mw of 1000 or less and a softening point of 60 to 120° C., (iii) 0.1 to 3 parts by weight of an internal mold release agent and (iv) 0.1 to 2 parts by weight of an organic peroxide. having a one-minute half-life temperature of 160° C. or more, and a pneumatic tire using the same.

BEST MODE FOR CARRYING OUT THE INVENTION

Figure 1:
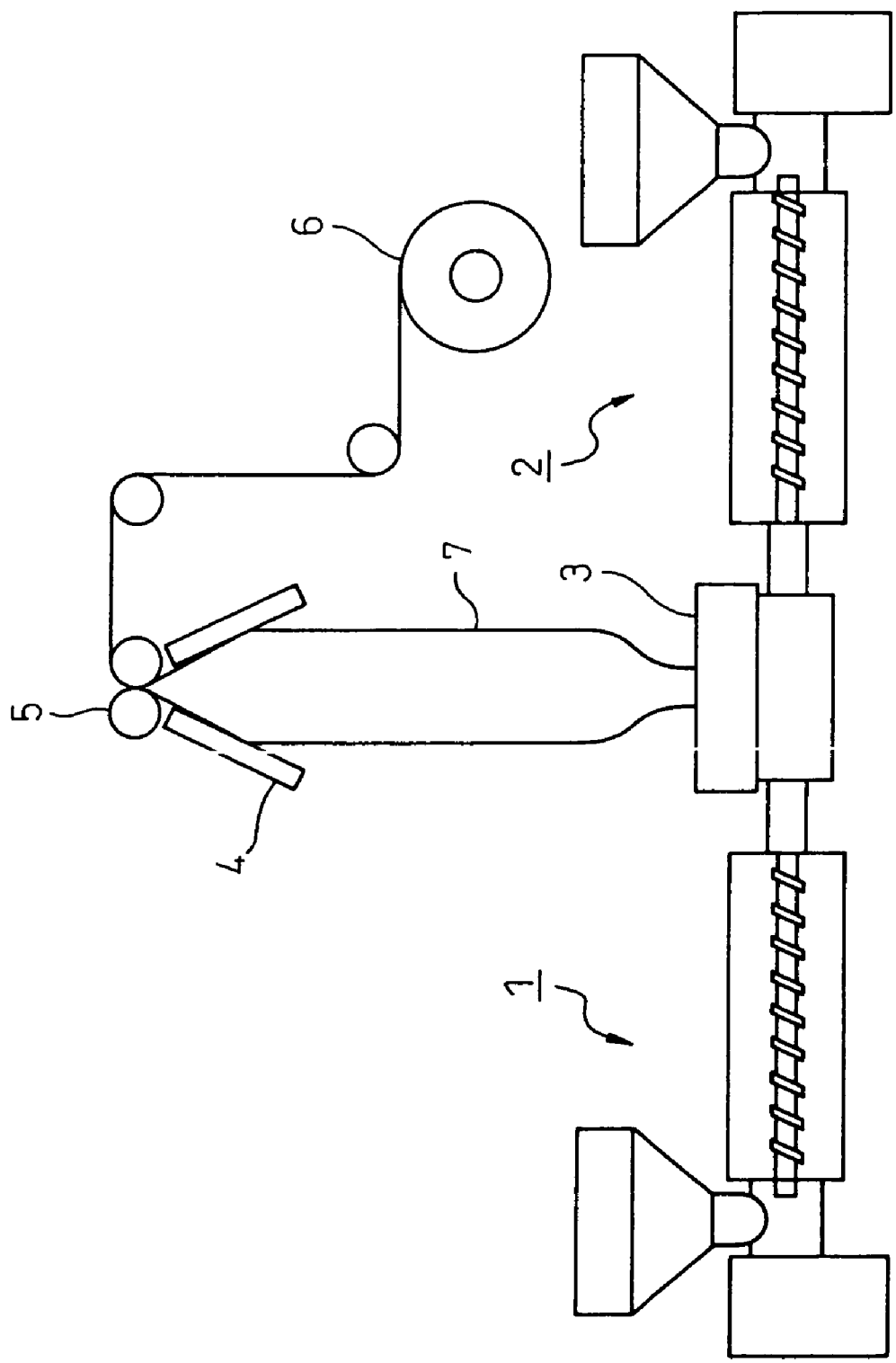
FIG. 1 is a schematic view of an inflation molding machine used for a test for evaluation of an adhesive composition in the Examples and Comparative examples in this description.

According to the present invention, it is possible to obtain a laminate of an adhesive composition, which keeps the polymer's self tack (tack of adhesives with each other) and tack with metal or a vulcanized rubber low to improve the workability, which exhibits sufficient tack with unvulcanized rubber at the time of tire formation and which is free from scorching, even when co-extruded at 200° C. or more temperature with a thermoplastic elastomer, and a thermoplastic elastomer air permeation preventive layer. By using this laminate, it is possible to obtain superior bondability and possible to obtain a light weight pneumatic tire, without affecting the other properties.

The singular forms (e.g., "a", "an", and "the") used in the present description and the attached claims should be understood as including the plural form except when otherwise clear from the context.

According to the present invention, an air permeation preventive layer composed of a thermoplastic elastomer composition having a thermoplastic resin, as a continuous phase, and a rubber composition, as a dispersed phase, is provided at one surface with an adhesive composition layer having a self tack of less than 5N, preferably 1 to 4N, a tack to an unvulcanized diene-based rubber of 5N or more, preferably 7 to 20N, and a thickness of 100 μm or less, preferably 5 to 70 μm, to form an air permeation preventive layer/an adhesive layer laminate.

An air permeation preventive layer used in the present invention and composed of a thermoplastic elastomer composition having a thermoplastic resin, as a continuous phase, and a rubber composition, as a dispersed phase, is known. For example, it is possible to use those described in Japanese Unexamined Patent Publication (A) No. 2002-80644, etc.

The adhesive composition usable in the present invention comprises (i) a total of 100 parts by weight of a thermoplastic elastomer containing at least 50 parts by weight or more, preferably 60 to 100 parts by weight, of an epoxy-modified (or epoxylated) styrene-butadiene-based block copolymer so that an oxirane oxygen content becomes 1 to 3% by weight, preferably 1.2 to 2.8% by weight, (ii) a total of 30 to 200 parts by weight, preferably 40 to 120 parts by weight, of a terpene resin (A) having a weight average molecular weight Mw of 1000 or less, preferably 500 to 900 and a softening point of 60 to 120° C., preferably 80 to 110° C., and an aromatically modified terpene resin (B) having a weight average molecular weight Mw of 1000 or less, preferably 500 to 900 and a softening point of 60 to 120° C., preferably 80 to 110° C., in a ratio of (A):(B)=100:0 to 50:50, preferably 100:0 to 70:30 (weight ratio), (iii) 0.1 to 3 parts by weight, preferably 0.2 to 2 parts by weight, of an internal mold release agent and (iv)

0.1 to 2 parts by weight, preferably 0.3 to 1 part by weight, of an organic peroxide having a one-minute half-life temperature of 160° C. or more, preferably 165 to 190° C.

The thermoplastic elastomer usable in the adhesive composition of the present invention, as explained above, must contain an epoxy-modified styrene-butadiene-based block copolymer (ESBS) having the specific oxirane oxygen concentration. This epoxy-modification, may be carried out by epoxylating, for example, a styrene-butadiene-based block copolymer (SBS) using peracids or hydroperoxides. As peracids, performic acid, peracetic acid, perbenzoic acid, trifluoroperacetic acid, etc. may be mentioned. Further, as hydroperoxides, hydrogen peroxide, t-butyl hydroperoxide, cumen peroxide, etc. may be mentioned. If the oxirane oxygen content of the epoxylated SBS copolymer (ESBS) this obtained is too low, the bondability with the air permeation preventive layer is liable to deteriorate, and therefore, this is not preferred, while conversely if it is too high, the bondability with the tire rubber is liable to deteriorate, and therefore, this is not preferred. Further, if the content of the ESBS copolymer in the thermoplastic elastomer is too small, the bondability with the air permeation preventive layer is liable to deteriorate, and therefore, this is not preferred.

As the matrix polymer of the adhesive composition according to the present invention constituted by the thermoplastic elastomer, in addition to the epoxylated SBS copolymer, various SBS copolymers, various styrene-isoprene block (SIS) copolymers and their partial hydrogenates etc. may be used.

The adhesive composition according to the present invention may contain a specific terpene resin (A) or a mixture of a terpene resin (A) and an aromatically modified terpene resin (B).

Here, "terpene" is the general term for the series of compounds having isoprene units. A "terpene resin" is a homopolymerized or copolymerized product mainly composed of oil obtained from pine tree resin or citrus fruit peel (e.g., α-pinene, β-pinene, dipentene (limonene), etc.). The solubility with a polymer and the softening point may change depending on the ratios and molecular weights (i.e., polymerization degrees) and molecular weight distributions of these monomers. The terpene resin (A) usable in the present invention is preferably, from the viewpoint of imparting bondability, a copolymer of β-pinene and dipentene or a homopolymer of dipentene. A homopolymer of dipentene is more preferable.

The aromatically modified terpene resin (B) can be produced by causing the terpene resin (A) to co-condense with a phenol, alkylphenol, etc. A commercially available product may also be used. The amount of the aromatic modification of the aromatically modified terpene resin (B) is not particularly limited, but preferably is about 1 to 20% by weight based upon the weight of the terpene resin.

The ratio of the terpene-based resin (A)/the aromatically modified terpene resin (B) in the present invention may be changed according to the working environmental conditions (e.g., temperature, humidity, etc.) and the degree of tack of the tire members. If the ratio of the terpene resin is greater, the self tack and the tack to metal or vulcanized rubber is decreased and the workability is improved, while conversely if the ratio of the aromatically modified terpene resin is greater, the tack with the unvulcanized tire member is improved. From this viewpoint, the present inventors found that, if (A):(B) is made 100:0 to 50:50 (weight ratio), preferably 100:0 to 70:30, a good balance thereof can be obtained. Further, if the thickness of the adhesive layer exceeds 100 μm, the weight is increased and the durability tends to deteriorate, and therefore, this is not preferred.

The adhesive composition according to the present invention may contain, therein for further adjusting the tack, an internal mold release agent in an amount of 0.1 to 3 parts by weight, preferably 0.1 to 1 part by weight, based upon the total 100 parts by weight of the thermoplastic elastomer. As the internal mold release agent, for example, the generally used stearic acid or oleic acid and their metal salts etc. may be used. By compounding an internal mold release agent in this way, it is possible, in particular, to lower the self tack. By suitably adjusting the compounded amount when adjusting the tack so as to correspond to the changes in an air temperature etc., it is possible to maintain the optimal state of tack.

In the present invention, as the cross-linking agent, an organic peroxide having a one-minute half-life temperature of 160° C. or more, preferably 165 to 190° C., is used for the crosslinking in an amount of 0.1 to 2 parts by weight, preferably 0.3 to 1 part by weight. As such an organic peroxide, specifically, for example, dicumyl peroxide, di-t-butyl peroxide, t-butylcumyl peroxide, benzoyl peroxide, 2,5-dimethyl-2,5-di (t-butylperoxy)hexine-3, 2,5-dimethyl-2,5-di (t-butylperoxy)hexane, 1,3-bis(t-butylperoxyisopropyl) benzene, 4,4-di-t-butylperoxy-valerenate-n-butyl ester, etc. may be used.

According to the present invention, the adhesive composition can be placed between a thermoplastic elastomer composition and a diene-based rubber to form a laminate for use for a pneumatic tire.

Therefore, there is provided a laminate of an air permeation preventive layer/an adhesive formed integrally in a cylindrical (tubular) shape with the air permeation preventive layer of the thermoplastic elastomer composition composed of a thermoplastic resin, as a continuous phase and a rubber composition, as a dispersed phase, at the inside and the adhesive composition at the outside has a superior in the bondability with a tire carcass and contributing to the reduction of tire weight.

As the diene-based rubber, any diene-based rubber usable for a tire, for example, natural rubber (NR), polyisoprene rubber (IR), various types of styrene-butadiene copolymer rubber (SBR), various types of polybutadiene rubber (BR), acrylonitrile-butadiene copolymer rubber (NBR), and further an ethylene-propylene-diene copolymer (EPDM), (halogenated) butyl rubber, etc. may be mentioned. These may be used alone or in any blend thereof.

As the resin components of the thermoplastic elastomer of the laminate according to the present invention, for example, polyamide-based resins (e.g., Nylon 6 (N6), Nylon 66 (N66), Nylon 11 (N11), Nylon 12 (N12), Nylon 610 (N610), Nylon 612 (N612), etc.), polyester-based resins (e.g., polybutylene terephthalate (PBT), polyethylene terephthalate (PET), polyethylene isophthalate (PEI), etc.), polynitrile-based resins (e.g., polyacrylonitrile (PAN), polymethacrylonitrile, etc.), polymethacrylate-based resins (e.g., polymethyl methacrylate (PMMA), polyethyl methacrylate, etc.), polyvinyl-based resins (e.g., vinyl acetate, polyvinyl alcohol (PVA), polyvinylidene chloride (PDVC), polyvinyl chloride (PVC), etc.), cellulose-based resins (e.g., cellulose acetate, and cellulose acetate butyrate), fluorine-based resins (e.g., polyvinylidene fluoride (PVDF), polyvinyl fluoride (PVF), etc.), imide-based resins (e.g., an aromatic polyimide (PI)), etc. may be mentioned.

The thermoplastic elastomer usable for the laminate according to the present invention is obtained by blending the thermoplastic resin and an elastomer. As the elastomer, for example, diene-based rubbers and the hydrogenates thereof (e.g., NR, IR, SBR, BR, NBR, etc.), olefin-based rubbers (e.g., ethylenepropylene rubber (EPDM, EPM), IIR, etc.), acryl rubbers (e.g., ACM), halogenated rubbers (e.g., Br-IIR, Cl-IIR, brominated isobutylene paramethylstyrene copolymer (Br-IPMS), etc.), silicone rubbers (e.g., methylvinyl silicone rubber, dimethyl silicone rubber, etc.), sulfur-containing rubbers (e.g., polysulfide rubber), fluororubbers (e.g., a vinylidene fluoride-based rubber, a fluorine-containing vinylether-based rubber), thermoplastic elastomers (e.g., a styrene-based elastomer, an olefin-based elastomer, an ester-based elastomer, a urethane-based elastomer or a polyamide-based elastomer), etc. may be mentioned. These may be used alone or in any blend of any two or more types.

The elastomer components can be dynamically vulcanized when mixed with the thermoplastic resin. Here, "dynamic vulcanization" means the thermoplastic resin, elastomer component and cross-linking agent are fed to, for example, a twin-screw mixer etc. and melt mixing the mixture, while the elastomer component is vulcanized. The vulcanization agent, vulcanization aid, vulcanization conditions (e.g., temperature and time), etc. in the case of dynamic vulcanization should be suitably determined depending upon the composition of the elastomer component added and is not particularly limited. As the vulcanization agent, a general rubber vulcanization agent (or cross-linking agent) may be used. Specifically, as the sulfur-based vulcanization agent, sulfur powder, precipitated sulfur, etc. may be used in an amount of, for example, 0.5 to 4 phr [parts by weight based upon 100 parts by weight of the rubber component (polymer)].

Further, as an organic peroxide-based vulcanization agent, specifically, for example, dicumyl peroxide, di-t-butyl peroxide, t-butylcumyl peroxide, benzoyl peroxide, 2,5-dimethyl-2,5-di(t-butylperoxy)hexine-3, 2,5-dimethyl-2,5-di(t-butylperoxy)hexane, 1,3-bis(t-butylperoxyisopropyl)benzene, 4,4-di-t-butylperoxy-valerenate-n-butyl ester, etc. may be mentioned. As a thiourea-based vulcanization accelerator, ethylenethiourea, diethylthiourea, etc. may be mentioned.

Further, the elastomer component may be used, together with general rubber use compounding agents. For example, zinc white, stearic acid and oleic acid and the metal salts thereof, etc. may be used. The production method of the thermoplastic elastomer composition comprises melt mixing, in advance, the thermoplastic resin component and elastomer component (in the case of rubber, unvulcanized) by a twin-screw kneader/extruder etc. to cause the elastomer component to disperse as a dispersed phase (i.e., domain) in the thermoplastic resin forming the continuous phase (i.e., matrix phase). When vulcanizing the elastomer component, it is possible to add the vulcanization agent, while mixing so as to cause dynamic vulcanization of the elastomer component. Further, the various compounding agents (other than the vulcanization agent) for the thermoplastic resin or elastomer component may be added during the mixing, but it is preferable to mix them before the mixing. The kneader used for mixing the thermoplastic resin and elastomer component is not particularly limited. A screw extruder, kneader, Banbury mixer, twin-screw kneader/extruder, etc. may be used. As the melt kneading conditions, the temperature should be at least the temperature at which the thermoplastic resin melts. Further, the shear rate at the time of mixing is preferably 1000 to 7500 $sec^{-1}$. The overall mixing time is preferably from 30 seconds to 10 minutes. When adding a vulcanization agent, the vulcanization time after addition is preferably from 15 seconds to 5 minutes. The thermoplastic elastomer composition prepared by the method is then extruded or calendered to form a sheet-like film. The film formation method may be based on the forming method of a usual thermoplastic resin or thermoplastic elastomer into a film.

The film thus obtained takes the structure of the thermoplastic resin (A) as a matrix in which the elastomer component (B) is dispersed as a dispersed phase (i.e., domain). By adopting such a dispersed structure, thermoplastic processing becomes possible and the air permeation preventive layer constituted by the film can be given sufficient flexibility and also sufficient rigidity due to the effect of the continuous phase constituted by the resin layer. Regardless of the amount of the elastomer component, at the time of shaping, a workability equal to that of a thermoplastic resin can be obtained. Therefore, a usual resin molding machine, that is, extrusion or calendering, may be used to form the film.

The ratio of the specific thermoplastic resin (A) and elastomer component (B), when blending the thermoplastic resin and elastomer, is not particularly limited and should be suitably determined by the balance of the film thickness, air permeation preventive property and flexibility, but the preferable range is, by weight ratio (A)/(B), 10/90 to 90/10, more preferably 15/85 to 90/10.

The adhesive composition used in the present invention may contain, in addition to the above essential components, various additives generally used in conventional adhesive compositions such as zinc oxide, an antioxidant, a coloring agent. These additives may be used by general methods. The amounts of these additives may be made the conventional general amounts blended so long as the object of the present invention is adversely affected.

EXAMPLES

Examples will now be used to further explain the present invention, but the scope of the present invention is not limited to these Examples.

Examples 1 to 4 and Comparative Examples 1 to 6

An adhesive composition of each formulation shown in Table I was mixed by a single-screw extruder having a screw diameter of 40 mmφ and passed through an anti-sticking solution, then was cut by a cutter into pellets. On the other hand, a thermoplastic elastomer composition having the formulation shown in Table II was mixed by a twin-screw extruder, then cooled in water and cut by a cutter into pellets. These pellets were extruded using 50 mmφ and 75 mmφ extruders and cylindrical stacking dies into cylindrical shapes having thicknesses of 50 μm and 150 μm. The test films thus obtained were subjected to the tests shown in Table I.

Test Methods for Evaluation

1) Tack Test

An adhesive composition of each formulation shown in Table I and the thermoplastic elastomer sheet shown in Table II were extruded using 50 mmφ and 75 mmφ extruders and tubular stacking dies into cylindrical shapes having thicknesses of 50 μm and 150 μm. The result was cut to a band having a width of 1 cm and attached to the ring part of the tack tester, which was then pressed perpendicularly against a 10 cm square piece cut from the same sheet in the case of self tack and against the unvulcanized carcass member in the case of tack for the carcass layer. The force, when peeling off the same, was measured. The measurement was conducted using a Toyoseiki PICMA tack tester under the following conditions. The results are shown in Table I.

| Measurement Conditions | |
|---|---|
| Dimensions of top sample: | 12.7 mm × 152 mm |
| Press load: | 4.90N |
| Peeling speed: | 120 mm/min |
| Press time: | 0 second |
| Temperature: | 20° C. |
| Relative humidity: | 65% |

2) Cylindrical Molding Workability Test

Each adhesive composition shown in Table I and the thermoplastic elastomer composition shown in Table II were extruded by the inflation method shown in FIG. 1 into a two-layer tubular shape having the adhesive layer at the outside. This was blown to a diameter of 355 mm, then folded by pinch rolls and taken-up (or wound-up) in that state. The following criteria were used for evaluation. The results are shown in Table I.

++: No problem in both extrudability and takeup

+: No problem in extrudability, while film tended somewhat to stick to pinch rolls, but this did not become a major problem ±: No problem in extrudability, but film stuck to pinch rolls and takeup was difficult −: Extrusion did not go well 3) Tire Moldability Test Each 355 mm thermoplastic elastomer/adhesive film laminate prepared by the inflation machine shown in FIG. 1 was cut to a width of 360 mm, then inserted into a tire forming drum, wrapped around a carcass, beaded, and turned up.

Next, the sides, belt, and cap were attached to thereby form a green tire. After formation, the degree of bonding of the tubular film and carcass was visually observed by the following criteria. The results are shown in Table I.

++: Carcass rubber exactly followed and no raised parts or peeling seen

+: Some raised parts seen, but no peeling from carcass seen

±: Some peeling and rising from carcass requiring correction by hand stitcher

−: Peeling from carcass over substantially entire circumference making transfer to vulcanization step impossible.

4) Bonding Test

Each thermoplastic elastomer film extruded and shaped together with an adhesive of Table I was laid over a 2 mm unvulcanized rubber sheet shown in Table III and vulcanized at 160° C. over 20 minutes. Each was cut to a strip having a width of 25 mm and a length of 100 mm. A cut was made into the center of the thermoplastic elastomer film in the width direction to thereby prepare a test sample. This was set in a Ueshima Seisakusho De-mattia crack tester and repeatedly subjected to continuous tensile strain by a chuck distance of 60 mm and a stroke of 10 mm 500,000 times, then any peeling of the film from the cut part was visually observed and evaluated by the following criteria. The results are shown in Table I.

++: No peeling of film seen at all

+: Slight peeling seen from cut part, but due to destruction of rubber or adhesive material −: Large peeling from cut part and forming interfacial peeling

TABLE I

| | Formulation of Adhesive Composition | | | | | | | | | |
|---|---|---|---|---|---|---|---|---|---|---|
| | Comp. Ex. 1 | Comp. Ex. 2 | Comp. Ex. 3 | Comp. Ex. 4 | Comp. Ex. 5 | Comp. Ex. 6 | Ex. 1 | Ex. 2 | Ex. 3 | Ex. 4 |
| Formulation (parts by weight) | | | | | | | | | | |
| E-GMA-VA (Bondfast 7B, Sumitomo Chemical)*[1] | 60 | — | — | — | — | — | — | — | — | — |
| Epoxylated SBS (Epofriend A1020, Daicel Chemical Industries)*[2] | — | 50 | 10 | 50 | 50 | 50 | 50 | 80 | 50 | 50 |
| SBS (Tufprene A, Asahi Kasei)*[3] | 40 | 50 | 90 | 50 | 50 | 50 | 50 | 20 | 50 | 50 |
| Rosin ester (Pensel AD, Arakawa Chemical)*[4] | 70 | 70 | — | — | — | — | — | — | — | — |
| Terpene resin (YS Resin D-105, Yasuhara Chemical)*[5] | — | — | 70 | — | 70 | 70 | 70 | 70 | 70 | 40 |
| Aromatically modified terpene resin (YS Resin TR-105, Yasuhara Chemical)*[6] | — | — | — | 70 | — | — | — | — | — | 30 |
| Zinc oxide (Zinc White #3, Seido Chemical) | 5 | 5 | 5 | 5 | 5 | 5 | 5 | 5 | 5 | 5 |
| Stearic acid (Beads Stearic Acid, Kao) | 1 | 1 | 1 | 1 | — | 1 | 1 | 1 | 1 | 1 |
| Organic peroxide (Parkerdox 14, Kayaku Akzo) | — | — | — | — | — | 2.5 | 0.1 | 1 | 1 | 1 |
| Test results | | | | | | | | | | |
| Self tack (N) | 2.3 | 2.6 | 3.7 | 6.3 | 5.3 | 3.4 | 3.5 | 3.0 | 3.4 | 4.8 |
| cylindrical molding workability | (+) | (+) | (+) | (±) | (±) | (−)*[1] | (++) | (++) | (++) | (+) |
| Tack with carcass (N) | 3.8 | 4.0 | 7.7 | 4.6 | 8.0 | | 7.4 | 5.9 | 7.4 | 10.1 |
| Tire moldability | (−) | (−) | (+) | (±) | (++) | | (+) | (+) | (+) | (++) |
| Bonding test | (+) | (+) | (−) | (+) | (+) | | (+) | (++) | (++) | (+) |

*[1]Molding was not possible.

Footnotes of Table I

*[1]Conventional adhesive (main ingredient: epoxy-modified ethylene-vinyl acetate copolymer)

*[2]Epoxy-modified styrene-butadiene-styrene block copolymer

*[3]Styrene-butadiene-styrene block copolymer

*[4]tackifing resin

*[5]tackifing resin

*[6]tackifing resin

TABLE II

Formulation of Thermoplastic Elastomer

| Name of material | Name of product | Manufacturer | Formulation amount (parts by weight) |
|---|---|---|---|
| Br-IPMS | EXXPRO 89-4 | Exxon Mobil Chemical | 100 |
| PA 6/66 | Ube Nylon 5033B | Ube Industries | 30 |
| PA 11 | Rilsan BESN O TL | Atofina Japan | 40 |
| Zinc oxide | Zinc White #3 | Seido Chemical | 0.2 |
| Stearic acid | Beads Stearic Acid | Kao | 0.5 |
| Zinc stearate | Zinc stearate | Seido Chemical | 0.3 |
| Plasticizer | BM-4 | Daihachi Chemical Industry | 10 |
| Antioxidant | Irganox 1098 | Ciba Specialty Chemicals | 0.5 |

TABLE III

Rubber Formulation

| Name of material | Name of product | Manufacturer | Formulation amount (parts by weight) |
|---|---|---|---|
| NR | RSS#3 | — | 60 |
| SBR | Nipol 1502 | Nippon Zeon | 40 |
| Carbon | Seast 300 | Tokai Carbon | 60 |
| Zinc oxide | Zinc White #3 | Seido Chemical | 5 |
| Stearic acid | Beads Stearic Acid | Kao | 1 |
| Antioxidant | Nocrac RD | Ouchi Shinko Chemical Industrial | 1 |
| Aromatic oil | Extract #4S | Showa Shell Oil | 10 |
| Sulfur | Oil-extended sulfur | Karuizawa Refinery | 3 |
| Vulcanization accelerator | Noccelar CZ | Ouchi Shinko Chemical Industrial | 1 |

In Table I, Comparative Example 1 is an example of the case using E-GMA-VA for the polymer of the adhesive and rosin ester for the tackifier and suffered from insufficient tack with the carcass and inability of tire molding. Comparative Example 2 is an example of the case using an SBS system for the polymer of the adhesive and a rosin ester system for the tackifier and suffered from insufficient tack with the carcass and inability of molding. Comparative Example 3 is an example of the case where the amount of the epoxy-modified styrene-butadiene-styrene block copolymer (ESBS) is less than the prescribed amount and suffered from poor results in the peeling test. Comparative Example 4 is an example of the case using only an aromatically modified terpene resin for the tackifier and suffered from too much self tack and moldability is difficult. Comparative Example 5 is an example of the case where no stearic acid (i.e., internal release agent) is used and suffers from too much self tack and moldability is difficult. Comparative Example 6 is an example of the case where the cross-linking agent, i.e., the organic peroxide is excessively contained and suffered from the production of a large amount of gel particles due to scorching of the adhesive during the extrusion.

Contrary to the above, Examples 1 and 3 are examples of the organic peroxide, i.e., the cross-linking agent, contained in the prescribed amounts and are free from scorching of the adhesive during extrusion work, superior in balance of self tack and tack with the carcass, and excellent in peeling test results as well. Example 2 is an example where the formulation amount of the epoxy-modified SBS is increase and is improved in bondability. Example 4 is an example of a case making the tackifier a blend of a terpene resin and aromatically modified terpene resin and is improved much more in tack with the carcass.

INDUSTRIAL APPLICABILITY

The air permeation preventive layer/an adhesive layer laminate of the present invention is superior in the workability in tire production, superior in bondability with a tire carcass, can contribute to the decrease in tire weight, and is suitable for use as a pneumatic tire.

The invention claimed is:

1. A laminate of an air permeation preventive layer/an adhesive layer provided with (I) an air permeation preventive layer comprising a thermoplastic elastomer composition containing a thermoplastic resin, as a continuous phase, and a rubber composition dispersed therein, as a dispersed phase, and (II) arranged on one surface of the air permeation preventive layer, an adhesive composition layer having a thickness of 100 μm or less formed from an adhesive composition having a self-tack of less than 5N and a tack to an unvulcanized diene-based rubber of 10.1-20N containing (i) a total of 100 parts by weight of a thermoplastic elastomer containing 50 parts by weight or more of an epoxy-modified styrene-butadiene-based block copolymer so that an oxirane oxygen content becomes 1 to 3% by weight, (ii) a total of 30 to 200 parts by weight of a terpene resin (A) having a weight average molecular weight Mw of 1000 or less and a softening point of 60 to 120° C. and an aromatically modified terpene resin (B) having a weight average molecular weight Mw of 1000 or less and a softening point of 60 to 120° C., in a ratio by weight of (A):(B)=70:30 to 50:50, (iii) 0.1 to 3 parts by weight of an internal mold release agent and (iv) 0.1 to 2 parts by weight of an organic peroxide having a one-minute half-life temperature of 160° C. or more.

2. A laminate of an air permeation preventive layer/an adhesive layer as claimed in claim 1, comprising the air permeation preventive layer of the thermoplastic elastomer composition comprising a thermoplastic resin as a continuous phase and a rubber composition as a dispersed phase at the inside and the adhesive composition at the outside, which are integrally formed in a cylindrical shape.

3. A laminate as claimed in claim 1, wherein said thermoplastic resin is a polyamide.

4. A laminate as claimed in claim 1 wherein the rubber composition is a rubber composed of a partially halogenated copolymer of isobutylene and paramethylstyrene.

5. A laminate as claimed in claim 1, wherein the terpene resin is a dipentene resin.

6. A laminate as claimed in claim 1, wherein the organic peroxide is dicumyl peroxide, 2,5-dimethyl-2, 5-di(t-butylperoxy) hexane or 2,5-dimethyl-2,5-di(t-butylperoxy) hexine-3.

7. A pneumatic tire using a laminate according to claim 1.

8. A laminate as claimed in claim 2, wherein said thermoplastic resin is a polyamide.

9. A laminate as claimed in claim 8 wherein the rubber composition is a rubber composed of a partially halogenated copolymer of isobutylene and paramethylstyrene.

10. A laminate as claimed in claim 2 wherein the rubber composition is a rubber composed of a partially halogenated copolymer of isobutylene and paramethylstyrene.

11. A laminate as claimed in claim 3 wherein the rubber composition is a rubber composed of a partially halogenated copolymer of isobutylene and paramethylstyrene.

12. A laminate as claimed in claim 2, wherein the terpene resin is a dipentene resin.

13. A laminate as claimed in claim 3, wherein the terpene resin is a dipentene resin.

14. A laminate as claimed in claim 2, wherein the organic peroxide is dicumyl peroxide, 2,5-dimethyl-2, 5-di(t-butylperoxy) hexane or 2,5-dimethyl-2,5-di(t-butylperoxy) hexine-3.

15. A laminate as claimed in claim 3, wherein the organic peroxide is dicumyl peroxide, 2,5-dimethyl-2, 5-di(t-butylperoxy) hexane or 2,5-dimethyl-2,5-di(t-butylperoxy) hexine-3.

16. A laminate as claimed in claim 4, wherein the organic peroxide is dicumyl peroxide, 2,5-dimethyl-2, 5-di(t-butylperoxy) hexane or 2,5-dimethyl-2,5-di(t-butylperoxy) hexine-3.

17. A laminate as claimed in claim 5, wherein the organic peroxide is dicumyl peroxide, 2,5-dimethyl-2, 5-di(t-butylperoxy) hexane or 2,5-dimethyl-2,5-di(t-butylperoxy) hexine-3.

18. A laminate as claimed in claim 6, wherein the organic peroxide is dicumyl peroxide, 2,5-dimethyl-2, 5-di(t-butylperoxy) hexane or 2,5-dimethyl-2,5-di(t-butylperoxy) hexine-3.

19. A pneumatic tire using a laminate according to claim 2.

20. A laminate as claimed in claim 5, wherein the aromatically modified terpene resin is the terpene resin is a dipentene resin copolymerized with an aromatic vinyl monomer.

* * * * *